US008010901B1

(12) United States Patent
Rogers

(10) Patent No.: US 8,010,901 B1
(45) Date of Patent: Aug. 30, 2011

(54) SYSTEM AND METHOD FOR AUTOMATED SYNCHRONIZED CO-BROWSING

(75) Inventor: Jarrod C. Rogers, San Diego, CA (US)

(73) Assignee: Sesh, Inc., San Diego, CA (US)

( * ) Notice: Subject to any disclaimer, the term of this patent is extended or adjusted under 35 U.S.C. 154(b) by 766 days.

(21) Appl. No.: 12/034,562

(22) Filed: Feb. 20, 2008

Related U.S. Application Data

(60) Provisional application No. 60/983,068, filed on Oct. 26, 2007.

(51) Int. Cl.
*G06F 3/00* (2006.01)
*G06F 3/048* (2006.01)
*G06F 15/16* (2006.01)

(52) U.S. Cl. ........ 715/751; 715/753; 715/754; 715/759; 715/788; 715/800; 709/204

(58) Field of Classification Search .................. 715/788, 715/800, 751, 753, 754, 759, 789; 709/204
See application file for complete search history.

(56) References Cited

U.S. PATENT DOCUMENTS

| | | | |
|---|---|---|---|
| 5,649,104 A | 7/1997 | Carleton et al. | |
| 5,790,818 A | 8/1998 | Martin | |
| 5,796,396 A * | 8/1998 | Rich | 715/741 |
| 5,867,156 A * | 2/1999 | Beard et al. | 715/753 |
| 6,144,991 A | 11/2000 | England | |
| 6,230,171 B1 * | 5/2001 | Pacifici et al. | 715/201 |
| 6,262,728 B1 | 7/2001 | Alexander | |
| 6,342,906 B1 | 1/2002 | Kumar et al. | |
| 6,654,032 B1 | 11/2003 | Zhu et al. | |
| 6,708,172 B1 * | 3/2004 | Wong et al. | 1/1 |
| 6,871,213 B1 * | 3/2005 | Graham et al. | 709/205 |
| 6,938,212 B2 | 8/2005 | Nakamura | |
| 7,050,632 B2 | 5/2006 | Shilman et al. | |
| 7,149,776 B1 * | 12/2006 | Roy et al. | 709/205 |
| 7,197,751 B2 * | 3/2007 | Fedotov et al. | 719/323 |
| 7,206,811 B2 * | 4/2007 | Skurikhin et al. | 709/205 |
| 7,213,059 B2 * | 5/2007 | Bhogal et | 709/219 |
| 7,266,779 B2 | 9/2007 | Baek et al. | |
| 7,286,141 B2 | 10/2007 | Rieffel et al. | |
| 7,287,054 B2 * | 10/2007 | Lee et al. | 709/204 |
| 7,356,563 B1 | 4/2008 | Leichtling et al. | |
| 7,370,269 B1 * | 5/2008 | Prabhu et al. | 715/230 |
| 7,401,294 B2 * | 7/2008 | Chang et al. | 715/733 |
| 7,595,798 B2 * | 9/2009 | Ben-Shachar et al. | 345/418 |
| 7,599,989 B2 * | 10/2009 | Stevens et al. | 709/204 |
| 7,634,540 B2 * | 12/2009 | Ivashin et al. | 709/204 |

(Continued)

OTHER PUBLICATIONS

Just van den Broecke, Pushlets, http://www.pushlets.com (Aug. 6, 2002).

*Primary Examiner* — Tadeese Hailu
*Assistant Examiner* — Nicholas S Ulrich
(74) *Attorney, Agent, or Firm* — Patrick J. S. Inouye; Krista A. Wittman

(57) ABSTRACT

A system and method for automated synchronized co-browsing is provided. A co-browse session is established and includes a plurality of Web browsers. Each Web browser is loaded with social session code, which displays a social viewport. Web content is obtained in response to a request from one such Web browser. The Web content is provided to each Web browser. Substantially similar portions of the Web content are made viewable in each social viewport by selectively resizing the social viewports of the Web browsers.

27 Claims, 10 Drawing Sheets

U.S. PATENT DOCUMENTS

| | | |
|---|---|---|
| 7,660,899 B2 * | 2/2010 | Gavrilescu et al. ............ 709/227 |
| 7,698,364 B2 * | 4/2010 | Andrew et al. ................ 709/204 |
| 7,752,561 B2 | 7/2010 | Yalovsky et al. |
| 2002/0198941 A1 * | 12/2002 | Gavrilescu et al. ............ 709/205 |
| 2003/0061286 A1 * | 3/2003 | Lin ................................ 709/205 |
| 2004/0133639 A1 * | 7/2004 | Shuang et al. ................. 709/204 |
| 2005/0091572 A1 * | 4/2005 | Gavrilescu et al. ............ 715/500 |
| 2005/0289452 A1 | 12/2005 | Kashi et al. |
| 2006/0010368 A1 | 1/2006 | Kashi |
| 2006/0031755 A1 | 2/2006 | Kashi |
| 2007/0118794 A1 | 5/2007 | Hollander et al. |
| 2008/0114844 A1 | 5/2008 | Sanchez et al. |
| 2008/0276183 A1 * | 11/2008 | Siegrist et al. ................. 715/748 |

* cited by examiner

Fig. 5.
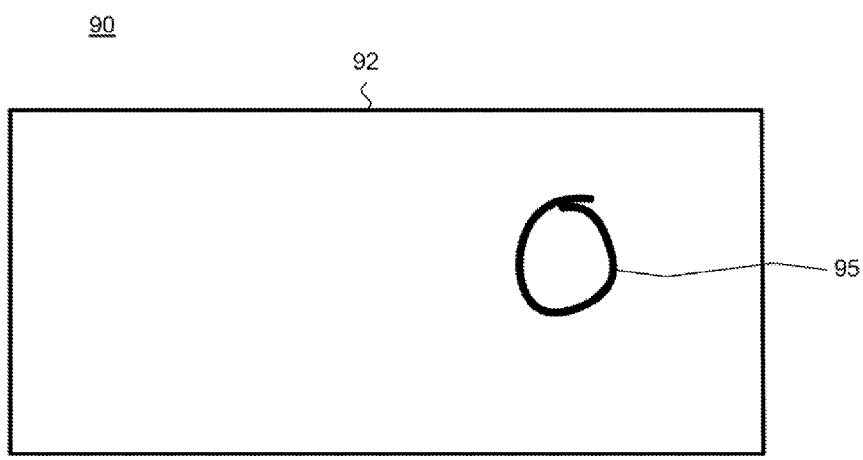
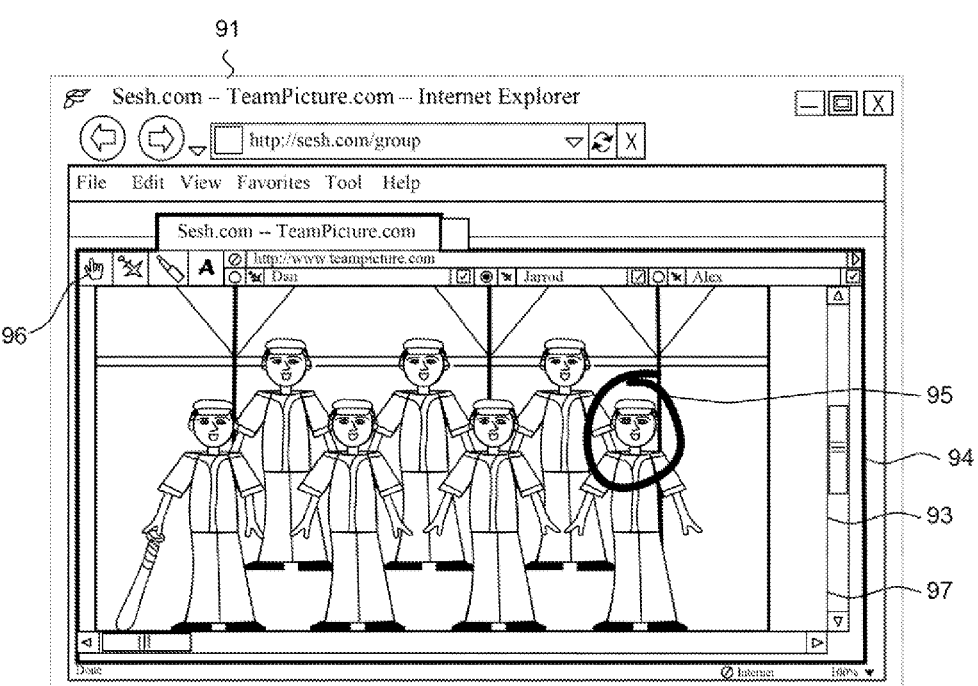

Fig. 7.
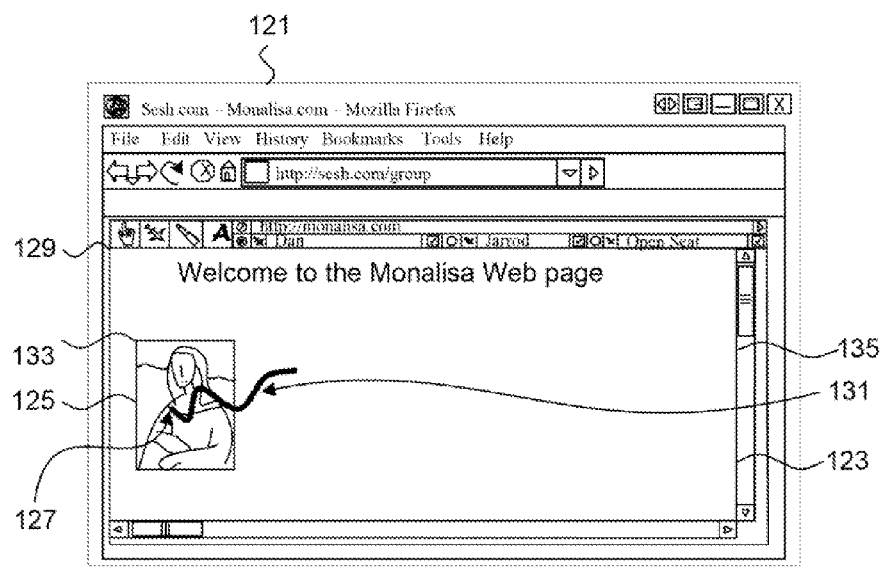
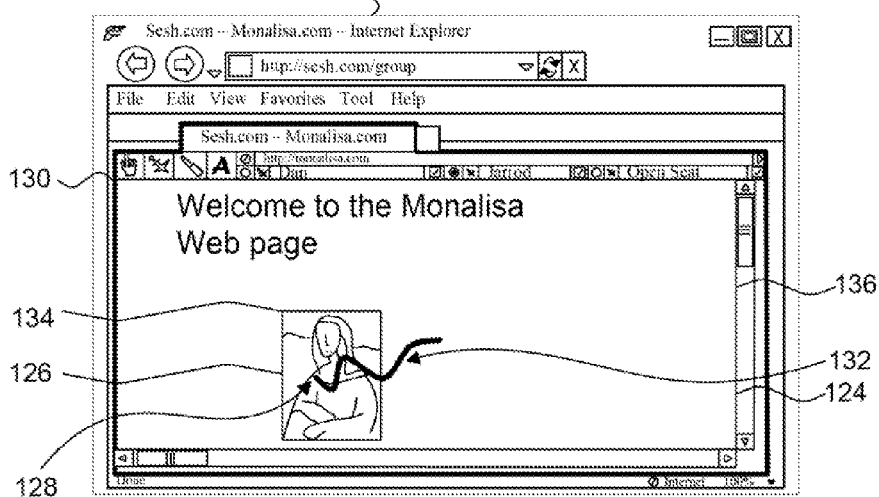

Fig. 8.
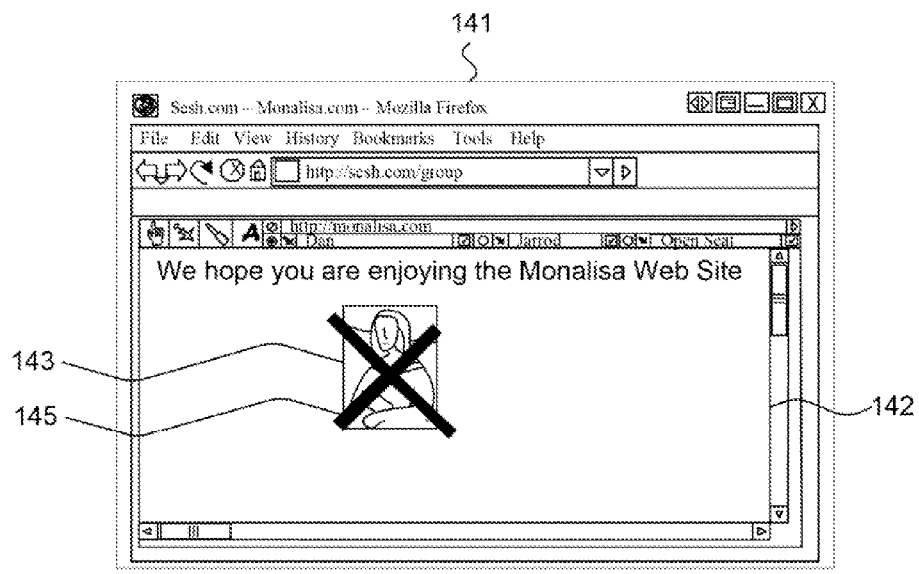
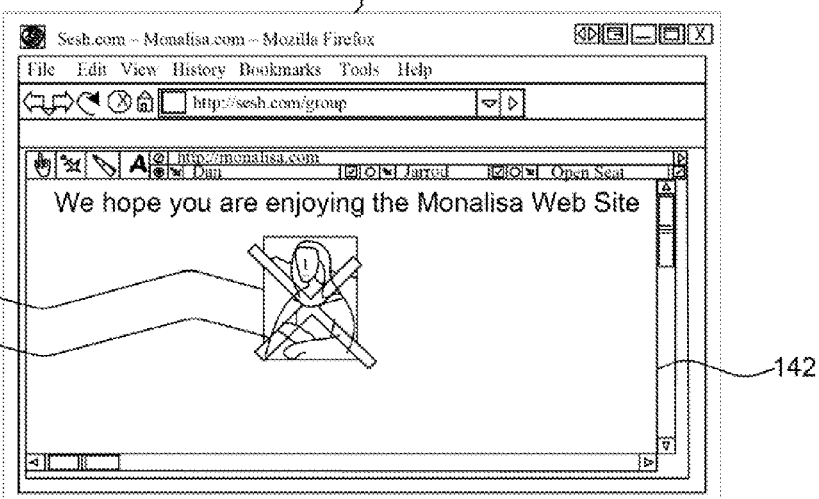

Fig. 9.
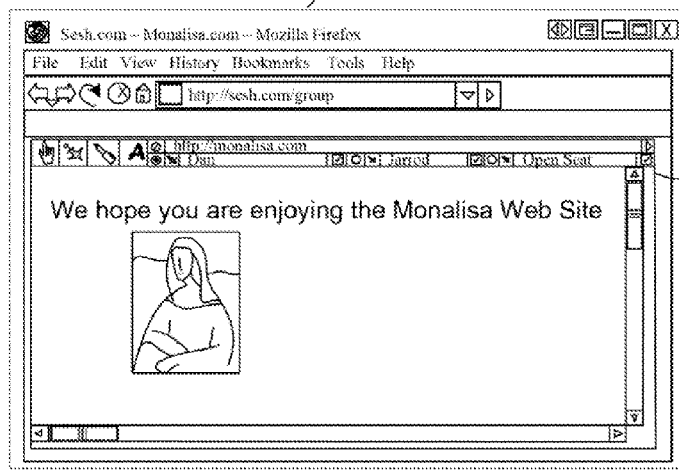
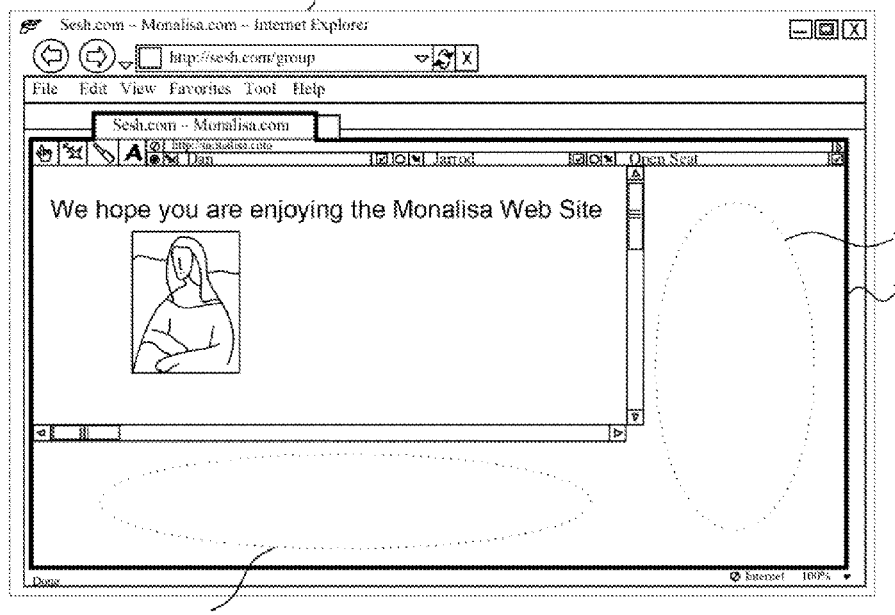

SYSTEM AND METHOD FOR AUTOMATED SYNCHRONIZED CO-BROWSING

CROSS-REFERENCE TO RELATED APPLICATIONS

This non-provisional patent application claims priority under 35 U.S.C. §119(e) to U.S. Provisional Patent application Ser. No. 60/983,068, filed Oct. 26, 2007, the disclosure of which is incorporated by reference.

FIELD

The invention relates in general to communication and, in particular, to a system and method for automated synchronized co-browsing.

BACKGROUND

The Internet has become an important social communications medium Technologies including email, Instant Messaging and Voice over Internet Protocol (VoIP), are utilized by hundreds of millions of individuals to communicate and socialize with each other. Yet Web browsing, which is the primary means of displaying and interacting with text, images and other information located on Web pages, has remained a solitary activity. Web users currently do not have an efficient way to browse the Web together and to share their thoughts about the Web pages they are viewing, and the information and images they contain. In contrast, in the offline world, comparable activities and tasks are often performed socially or as a group. For instance, friends can shop together at a clothing store and point out and discuss particular clothes or outfits they are considering purchasing.

Many Internet users attempt to approximate the offline group experience by manually supplementing Web browser coordination with additional technologies, such as voice via telephone or text via email and Instant Message. However, independently coordinating multiple Web browsers and attempting to describe and identify particular items on a particular Web page through voice or text can be difficult and frustrating.

Various co-browse methods have been developed, but they remain unpopular. Besides being difficult to use, they fail to insure that each user's view of the Web content remains the same throughout the co-browse session, causing contusion and uncertainty among users. Existing co-browse methods also fail to enable users to communicate and visually share their thoughts in real time regarding the Web pages and items they are viewing. Co-browse users can feel disconnected because a social face-to-face experience is not simulated.

Other methods have been developed to simulate offline group experiences in an online setting. For example, Web conferencing allows individuals to view presentations and conduct meetings online. Generally, Web conferencing systems broadcast the entire screen of one computer onto the screens of other computers participating in the conference. Examples of existing Web conferencing systems include WebEx (www.webex.com), GoToMeeting (www.gotomeeting.com), and Microsoft LiveMeeting (www.office.microsoft.com/livemeeting). These systems are generally autocratic in nature. A meeting manager controls the session, which may be displayed in a viewer's Web browser via, a separate application or plug-in. However, the available Web conferencing systems are not designed to enable simultaneous two-way communication on Web pages, nor to allow synchronized co-browsing and equal participation via visual communication.

Online collaboration and digital annotation systems have also been developed, which typically allow users to create and store annotations of Web pages and digital documents for later retrieval. Examples include iMarkup (www.imarkup.com) and SharedCopv (www.sharedcopy.com). However, these systems do not allow co-browsing or same time communication.

Additionally, U.S. Patent Application Publication No. 2005/0289451, to Kashi et al., and U.S. Patent Application Publication Nos. 2006/0010368 and 2006/0031755, to Kashi, all disclose digital ink annotations, which are captured and stored for later retrieval. The ink, annotations are made by a user and rendered on a Web browser. However, Kashi fails to disclose simultaneously displaying ink annotations on multiple Web browsers. Ink annotations are correlated at the end of the drawing stroke, and then transmitted to a server, such that simultaneous display on multiple Web browsers of ink annotations as they are progressively created is not possible.

Therefore, there remains a need for an approach that allows two or more individuals to co-browse and visually communicate their thoughts regarding the Web page they are viewing, such that Web browsing is no longer confined to being a solitary activity.

SUMMARY

A system and method to provide visual social communication through automated synchronized co-browsing. Users participate in a co-browse social session by utilizing Web browsers running on separate computing devices, which are connected to a social session Web server running the co-browse proxy servlet and social relay servlet technologies described herein. Each Web browser loads social session code, which may be in the form of a social session Web page. The social session code remains loaded in each Web browser throughout the social session. The social session code displays a viewport containing the users' desired Web page content obtained from a Web server located on the internetwork after being processed by the co-browse proxy servlet technology. The viewports are sized and positioned such that substantially similar portions of the same Web page content are synchronously displayed in each viewport. Each user can make social changes such as free drawings or text annotations on a transparent overlay located over his Web browser's viewport. Each social change is sent to social relay servlets running on the social session Web server, which coordinate the social session by transmitting, without delay, the social change to the other Web browsers. Each receiving Web browser creates a mirror image of the social change on a transparent overlay located over the viewport which displays the content Web page. The social change may fade with time until no longer visible. All users in the social session have the ability to make social changes, navigate the Web content displayed in the social viewport, and request and display other Web pages served by Web servers located on the internetwork. Each Web browser is assigned one or more identifiers such as name or color. Social changes, navigation actions, scrolling actions and Web browser sizing actions contain or generate corresponding identifiers which enable the users of each other Web browser to easily determine which Web browser is responsible for a particular action.

One embodiment provides a system and method for automated synchronized co-browsing. A co-browse session is established and includes a plurality of Web browsers. Each Web browser is loaded with social session code, which displays a social viewport. Web content is obtained in response to a request from one such Web browser. The Web content is provided to each Web browser. Substantially similar portions of the Web content are made viewable in each social viewport by selectively resizing the social viewports of the Web browsers.

Conventional Web browsing has remained a solitary activity. Web users have not had an efficient way to browse the Internet together and to share their thoughts about the Web pages they are viewing. The embodiments herein enable a new way to communicate online, where users can share their ideas with other users in a social session by visually communicating by inserting social changes on synchronized displays of Web content. By providing commensurate viewports and scrolling, synchronization, the embodiments ensure that each user's view of the Web content remains the same throughout the social session, preventing confusion. User self-governance is facilitated through a system of visual accountability, where each user and his actions are identified with visual cues. To ensure high ease of use and widespread accessibility, the embodiments are performed exclusively through functionality native to standard Web browsers without plug-ins or downloads, and communication is performed through standard firewalls via the standard default ports for Hypertext Transfer Protocol (HTTP) and Hypertext Transfer Protocol over Secure Socket Layer (HTTPS).

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a screen shot of a Web browser and a corresponding transparent overlay located over a social viewport of a social session Web page.

FIG. 7 is a screen shot showing two Web browsers with different layouts of Web content.

FIG. 8 is a screen shot of a Web browser with a temporary social change that fades over time.

FIG. 9 is a screen shot showing commensurate Web pages on separate Web browsers.

DETAILED DESCRIPTION

Many users rely on the Internet as an important social communications medium. However. Web browsing remains as solitary activity. More specifically, Web users currently do not have an efficient way to browse the Web together and to share their thoughts about the Web page they are viewing. Visual social communication allows a user to share his ideas with other users while Web browsing during a social session.

System Overview

Figure 1:
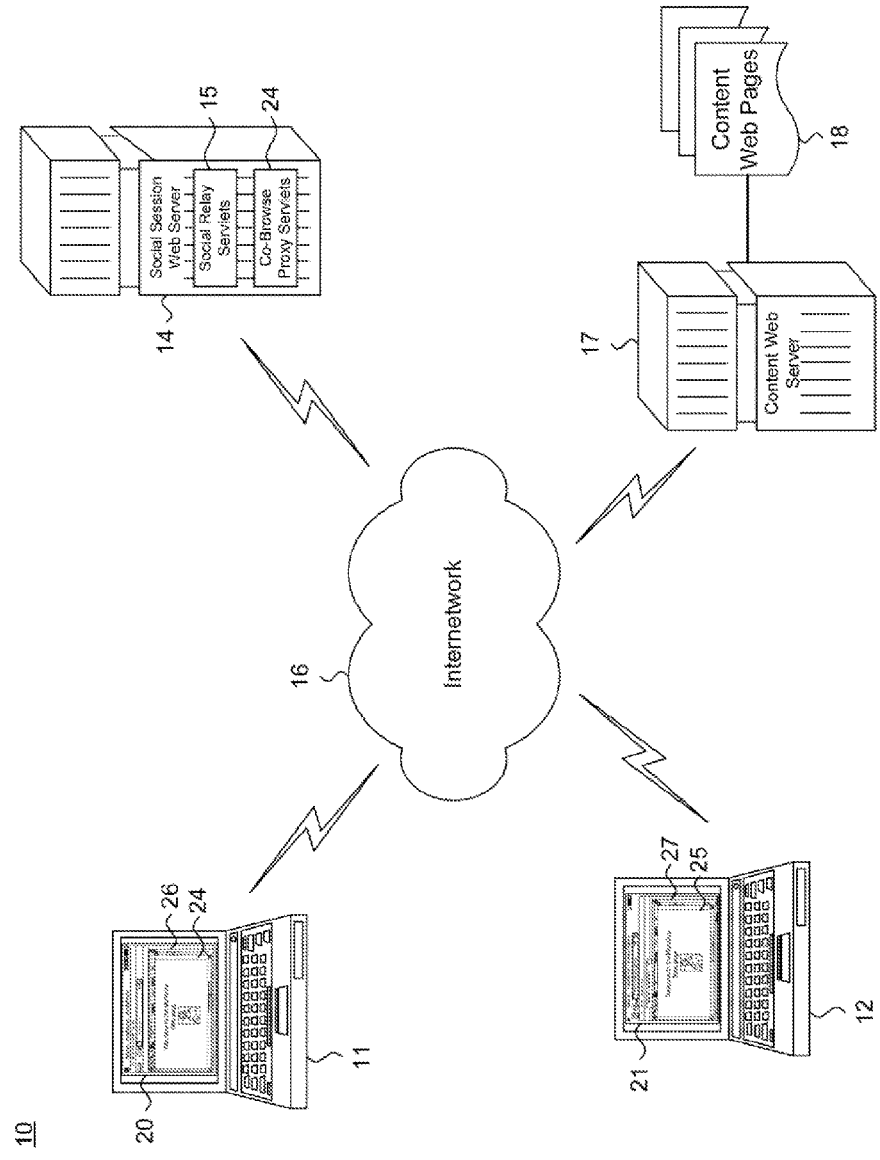
FIG. 1 is a block diagram showing a system for visual social communication through co-browsing in accordance with one embodiment.

FIG. 1 is a block diagram showing a system for visual social communication through co-browsing in accordance with one embodiment. A first computer 11, including a Web browser 20 is connected to a social session Web server 14 via an internetwork 16, such as the Internet. A second computer 12 including a Web browser 21 is also connected to the social session Web server 14 via, the internetwork 16. The computers 11, 12 can include desktop and notebook computers, as well as handheld devices, including Personal Digital Assistants (PDAs) and cellular telephones. At a minimum, each computer should include a Web browser or similar application and accessibility to an internetwork. In one embodiment, the Web browsers 20, 21 are enabled with JavaScript.

A user joins a social session by loading social session code. One embodiment provides that the social session code is contained, in a social session Web page 26,27 which is requested from the social session Web server 14 and loaded in the Web browsers 20,21. The social, session Web page 26, 27 remains loaded on each of the Web browsers 20, 21 throughout the social session, and contains a social viewport 24, 25. The social viewport 24, 25 allows the users to loud any content Web page 18 available on the internetwork 16. The Web browser 20, 21 sends a request to co-browse proxy-servlets 24, which run on the social session Web server 14, to load a content Web page. The co-browse proxy servlets 24 receive the request and further request the content Web page 18 from a content Web server 17. The content Web server 17 can be any Web server, which serves Web pages for a particular uniform resource locator (URL).

The co-browse proxy servlets 24 receive the content Web page 18 requested as HyperText Markup Language (HTML). Before transmitting the content Web page 18 to the Web browsers 20, 21, the co-browse proxy servlets 24 edit the hyperlinks and callbacks in the HTML of the content Web page 18, such that the hyperlinks are redirected to the co-browse proxy servlets 24. The co-browse proxy servlets 24 then transmit the processed content Web page 18 to the Web browsers 20, 21 for display in their respective social viewports 24, 25. Thus, when a user clicks on a hyperlink in the content Web page, his Web browser 20, 21 contacts the co-browse proxy servlets 24 directly, instead of contacting the content Web server 17. In addition, each Web browser can also download the images in the content Web page 18 directly from the content Web server 17 for efficiency and to reduce the bandwidth required from the social session Web server 14.

Each user can make social changes on the content Web page 18 displayed in his social viewport 24, 25. The social changes, which are further described with reference to FIGS. 3-8, can include drawing, drafting, text annotating, text chatting, inserting an image, inserting audio and mouse cursor movement. Each social change is transmitted to the social relay servlets 15, which further transmit the social change to the other Web browsers 20, 21. Each receiving Web browser duplicates the social change on a transparent overlay located over the social viewport 24, 25. The social changes are transmitted and reproduced smoothly in segments as they are progressively created.

The individual servers 14, 17 and computers 11, 12 are general purpose, programmed digital computing devices generally consisting of a central processing unit (CPU), random access memory (RAM), non-volatile secondary storage, such as a hard drive or DVD-ROM drive, network interfaces, and peripheral devices, including user interfacing means, such as a keyboard, pointing device, and display. Program code, including software programs, and data are loaded into the RAM for execution and processing by the CPU. Results are generated for display, output, transmittal, storage, and other actions, Social Courtesies and Equal Participation When people converse face-to-face in a group, common social courtesies are typically followed and participants can self-govern their actions. However, social courtesies are not always strictly followed. People sometimes talk over each other, causing confusion, and as a result, communication can break down. To prevent similar confusion and conversation breakdown in online social visual conversations, user self-governance is promoted through visual accountability. Each Web browser is provided with a personalized identifier such as a name, text, color, sound, and image, or other identifier. Social changes, navigation actions and Web browser sizing actions contain or generate corresponding notification identifiers which enable the users of each other Web browser to easily determine which Web browser is responsible for a particular action. Navigation actions include loading a content Web page and scrolling a content Web page within a social viewport.

Mouse cursor movement within the social viewport of each Web browser may be displayed in each other Web browser. The mouse cursor of each Web browser may contain or generate a notification identifier corresponding to the Web browser; the identifier may be displayed in the other Web browsers. In this way, a user can point and draw attention of the users of the other Web browsers to items on the content Web page, simply by moving his mouse cursor near the item, and the other users can identify which Web browser made the cursor movement. The identifiers for social changes, navigation actions and cursor movements can be the same or different.

Notification identifiers of a social change may take many forms. A social change may itself contain the notification identifier, such as a color or sound. Alternatively, a component affected by or in proximity to the social change may contain or act as an identifier; for instance, a Web browser user can freehand draw over a component such as an image on the content Web page, or over another social change, and the image or other social change may change color or otherwise identify that the component has been affected by the social change. The notification identifier may also be a representation of the social change; for instance, a Web browser user may freehand draw a line, and a representation that the user is freehand drawing may appear in a user bar or action box on the social session Web page which shows the actions currently being performed by each Web browser. A Web browser's mouse cursor may also be modified to reflect the generation of a social change.

Navigation and Web browser sizing actions similarly contain or generate corresponding notification identifiers to indicate which Web browser is responsible for a particular action. A component such as a navigation bar, scroll bar, user bar, social viewport, and Web browser status bar may contain or act as an identifier. For instance, a user of one Web browser can scroll the Web content in the social viewport, which may synchronously cause the Web content in the other Web browsers to scroll; the scroll bars in each of the Web browsers may change color, flash or otherwise identify that the scrolling action was caused by the first Web browser. Similarly, a change indicator in proximity to the component, and/or representing the component, may contain or act as an identifier.

For instance, a user of one Web browser may reduce the size (i.e., dimensions) of the Web browser, causing the social viewport to shrink with it, which may synchronously cause the social viewports in the other Web browsers to adjust to a smaller size; a change indicator such as text and/or color in the area of the Web browser outside of the social viewport (e.g., see FIG. 9 at 155,156) may identify the Web browser responsible for the new horizontal and/or vertical dimensions. A user's mouse cursor may also be modified in his Web browser and as displayed in the other Web browsers to reflect the generation of a navigation action.

Navigation actions may be restricted when a Web browser user is creating a social change, to prevent confusion and allow the user to complete the social change. Navigation actions may be re-enabled after the user completes the social change. For example, a Web browser user may circle an image in a content Web page to visually discuss the image with the other Web browser users. While the first user is circling the image and the circle is being reproduced in the social viewports of the other Web browsers, the users of the other Web browsers are unable to scroll the Web page away from the picture or to click on a hyperlink or otherwise load a new content Web page. This helps ensure an audience for the user's social change action. Otherwise, users of the other Web browsers may not notice the drawing action by the first user if they are able to scroll or navigate away from the image at the beginning of the circle stroke. Similarly, the first user creating the circle on the image may become confused and frustrated if his drawing action is interrupted by another user scrolling the Web page away from the image. Restricting navigation actions during a social change thus helps prevent confusion and social visual communication breakdown.

Figure 2:
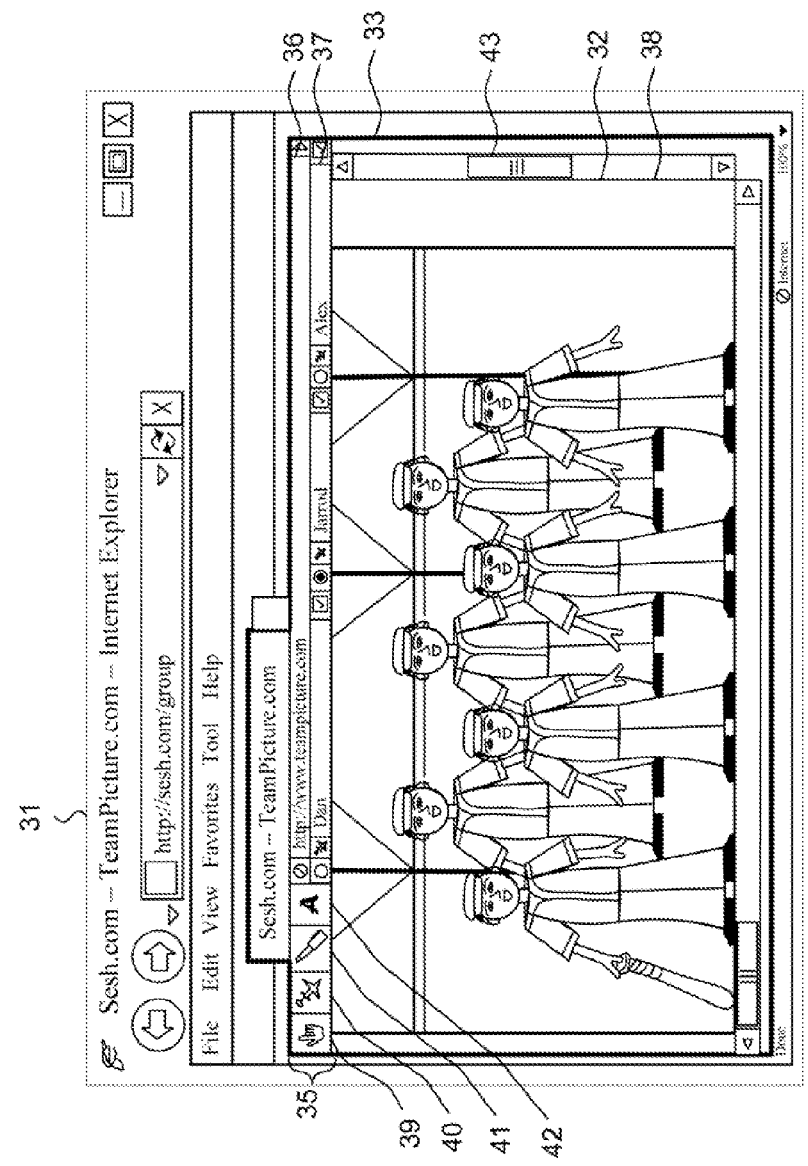
FIG. 2 is a screen shot of a Web browser with a social session Web page and social tools.

FIG. 2 is a screen shot 30 showing a Web browser 31 with a social session Web page 33 and social toolbars. The set of social toolbars can include: (1) a social change toolbar 35, which contains selectable tools; (2) a location toolbar 36, which contains a source URL of a content Web page 38 loaded in a social viewport 32; and (3) a user toolbar 37, which identifies a name, color, and active social tool for each of the users participating in the social session.

Located below the social toolbars is the social viewport 32, which contains the content Web page 38 loaded via co-browse proxy servlets which run on a social session Web server. The social change toolbar 35 contains tools, including: (1) a drawing fade tool 40, which draws semi-transparent markings that are temporary in nature and fade with time; (2) a drawing permanent tool 41, which draws permanent semi-transparent markings, (3) a text annotation tool 42, which enables users to insert semi-transparent collapsible text boxes to communicate or serve as a reminder for later; and (4) a selector tool 39, which, when active, temporarily removes a transparent overlay on the social viewport 32 to enable the user to select and click on items in the content Web page 38 appearing in the social viewport 32. Other toolbars and tools are possible, such as an eraser tool, a drafting tool which allows drawing of vector images and shapes, a text chatting tool, an image stamp tool, an emoticon tool, and an audio insertion tool.

The user toolbar 37 identifies Web browser users that are participating in the social session. Each Web browser user can be identified by an assigned name, color, and the tool currently selected by that user from the social change toolbar 35. The identifier assigned to each user, such as a color, can be reflected in the background of the social toolbars on each user's Web browser 31. The user toolbar 37 may also contain a marker to distinguish the Web browser user from the other participants listed. Other tools, number of participants, and identifiers are possible.

Each user is accountable for his actions via the social toolbars, which assist the other users in determining the Web browser responsible for a social change, navigation action or Web browser sizing action. User accountability can smoothly guide the social session and prevent confusion. For example, three users are participating in a three-way telephone conversation regarding finding a 1998 Seattle Mariners team photo with baseball player Ken Griffey Jr. on the Internet. The users are each sitting in front of separate computers with Internet access and decide to look for the team photo together. The users each load a social session Web page 33 by entering or linking to an identical URL in their respective Web browsers 31, such that all the Web browsers 31 participating in a social session are simultaneously connected to a social session Web server.

A first user types the URL, www.google.com, into a location toolbar 36 of the social session Web page 33. All three users will see the text, www.google.com, appear in the location toolbar 36 on their respective social session Web pages 33. Each social session Web page 33 includes a social viewport 32, which loads Google's homepage as the content Web page 38. The navigation action generates a notification identifier in the form of the location toolbar 36 temporarily flashing green; the color green is the unique identifier for the first user's Web browser. Thus, the second and third users know that the first user loaded the Google content Web page 38 in their social viewports 32. The other users can also look at a user toolbar 37 to see the name of the first user. If there is no name defined, any user can enter a name to identify the first user.

The second user, who is identified by the color red, selects the search box on Google's homepage and types in the phrase "Seattle Mariners 1998 team photo." The second user chooses a selector tool 39 and then clicks on a search button. The first and third users can anticipate that the second user is performing a navigation action because a representation of the selector tool flashes red next to the second user's name on the user toolbar 37. The first and third users also can view in their social viewports the mouse cursor of the first user move over the search button prior to its being, clicked.

Search results for the phrase "Seattle Mariners 1998 team photo" are displayed in the content Web page 38 in the social viewport 32 of each Web browser. The location toolbar 36 reflects a change of the URL to the Google search results page and temporarily flashes red to indicate that the navigation action was performed by the second user. All three users then view the Google search results content Web page 38 in their respective social viewports 32. The second user clicks on a hyperlink for a relevant Web page listed in the search results. The Web page associated with the selected hyperlink is displayed as a new content Web page 38 in the users social viewports 32, which shows the 1998 Seattle Mariner baseball team statistics. However, the users wish to view the team photo.

The second user moves a scroll bar 43 in his social viewport 32 to scroll down toward the bottom of the content Web page 38, bringing the Mariners team photo into view on all three social viewports 32. The scroll bar 43 flashes red when the second user moves the scroll bar, notifying the other users that the second user is responsible for the scrolling action. The users can now view the team photo on the content Web page 38. Each user participating in the social session is notified of the actions of the other users via the social change and navigation identifiers, which can reduce confusion and promote further conversation.

Synchronized Co-Browsing

Many online tasks, particularly Web browsing, are performed in isolation without an opportunity for online social interaction. However, people often prefer performing certain tasks socially or in groups, such as Shopping, viewing photographs, and decision making. Often, users can experience difficulty in co-browsing. Web pages from different physical locations. A user can attempt to describe an object of interest or a location of the object to another user. However, the other user may be unable to find the described object without further assistance.

Synchronized co-browsing can ensure that users involved in a social session are viewing, the same Web page content. Social viewports can serve as a common focal point for the conversation as the users browse and discuss a content Web page. Each user can navigate to different content Web pages within their social viewports by typing a URL in the location toolbar, clicking on a hyperlink in the content Web page, performing a search on the content Web page, recalling a Web browser history, as well as by other actions. When the user clicks on a hyperlink, co-browse proxy servlets receive a request for the content Web page and further the request to a content Web server.

The co-browse proxy servlets receive the content Web page and edit the hyperlinks and callbacks in the HTML of the content Web page to redirect the hyperlinks to the co-browse proxy servlets. The co-browse proxy servlets then transmit the edited content Web page to the Web browsers, such that the same Web page is displayed in the social viewport of each Web browser's social session Web page. Each Web browser can download the images of the specified content Web page directly from the content Web server for efficiency and to reduce the bandwidth required from the social session Web server.

The social session Web page may display the content Web page load progress of all users participating in a social session. Each user may view the progress of all other users in loading a content Web page in their respective Web browsers. By utilizing the displayed load information, a user may thereby refrain from making a navigation action or social change until the content Web page has completed loading and is displayed in the social viewports of all Web browsers participating in the social session.

Permissible social change and navigation actions may be defined with regard to each of the Web browsers, and at least one Web browser may be restricted to the permissible actions. For instance, a Web browser may be configured to be the sole Web browser which can make navigation actions; the other Web browsers may be restricted from making any navigation actions during the social session.

In one embodiment, the Web browsers are enabled with JavaScnipt and utilize Asynchronous JavaScript and Xtensible Markup Language (AJAX) based requests to connect to the social relay servlets via pushlets. Pushlets are described in the article Just van den Broecke, Pushlets, http://www.pushlets.com, Aug. 6, 2002, the disclosure of which is herein incorporated by reference. The social session and all communication within the social session among the Web browsers are performed through functionality native to the Web browsers exclusively. The social session is transacted entirely through the standard default ports for HTTP (port 80) and HTTPS (port 443) communication Web protocols, and all communication is initiated by the Web browsers. This allows the social session to be accessed through any standard Web browser, through standard secure firewalls and without installation of applications. Web browser plug-ins including Java applets and Adobe Flash, ActiveX controls, security permissions, or signed scripts. The social session code is contained within a social session Web pave, which is easily and automatically loaded simply by accessing the URL of the social session Web page. This ensures that the widest number of users and Web browsers can easily and automatically utilize the invention.

However, other implementations are possible, such as the installation of applications, Web browser plug-ins, or ActiveX controls, which can hold another port open over time to enable reuse.

Social Chance Representation

Figure 3:
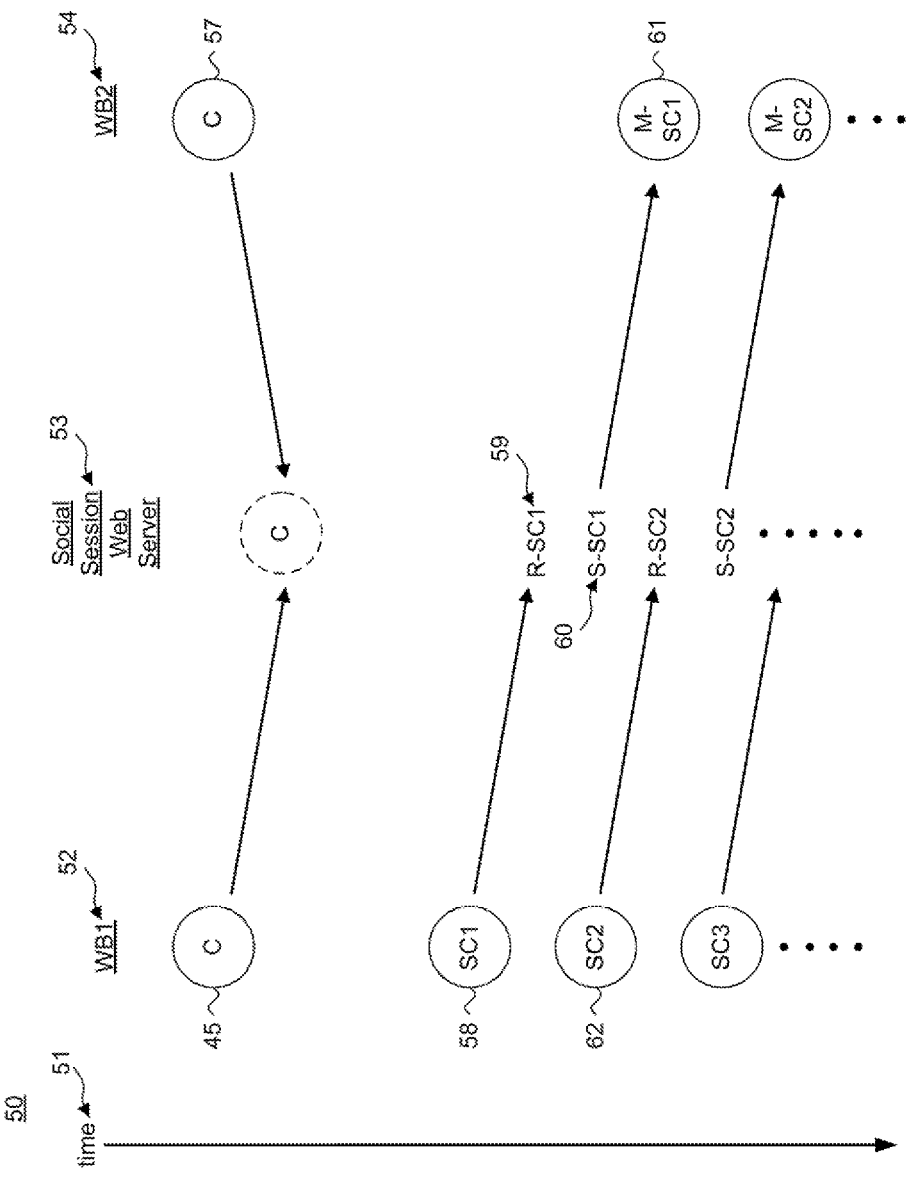
FIG. 3 is a timing diagram showing an initiating Web browser, server, and receiving Web browser for sending and receiving social changes.

A social session involves two or more users communicating through separate Web browsers or separate computers that are linked via a social session Web server (shown in FIG. 1). During the social session, a user can make social chances on a transparent overlay located on top of a social viewport displayed in a Web browser. In another embodiment, the social changes are inserted directly in the HTML of the content Web page. The social changes are communicated to the other users' Web browsers for display at substantially the same time. FIG. 3 is a timing diagram 50 showing an initiating, drawing. Web browser 52 (WB1), social session Web server 53, and receiving Web browser 54 (WB2) for respectively sending and receiving data over time 51.

Prior to starting the social session, the initiating Web browser 52 and the receiving Web browser 54 connect to an internetwork, such as the Internet, to load a common social session Web page from the social session Web server 53. The Web browsers 52, 54 then connect ("C") to the social session Web server 53 via social relay servlets. In one embodiment, the Web browsers 52, 54 are enabled with JavaScript and use AJAX to communicate with the social relay servlets running on the social session Web server via pushlets.

A user of the initiating Web browser 52 makes a request to load a content Web page in the social viewport of the social session Web page loaded on the Web browser 52. Co-browse proxy servlets receive the request, access the content Web server specified in the request, and transmit the processed content Web page for display in the social viewports of the initiating and receiving Web browsers 52, 54.

The user initiates a social change 58 ("SC1") using controls, such as a mouse, keyboard, stylus, buttons, or touch screen. Other user interface controls are possible. The social change 58 can include freehand drawing, drafting such as vector based shapes and lines, text annotating, text chatting, inserting an image, inserting audio, and mouse cursor movement. However, other types of social changes are also possible. Once the social change 58 is begun, the social relay servlets running on the social session Web server 53 receive information 59 ("R-SC1") regarding the social change or a social change segment 48 for transmission 60 ("S-SC1") to the second Web browser 54 for display. The social change or social change segment 61 (M-SC1) received by the second Web browser 54 is recreated to mirror the social change 58 displayed on the first Web browser 52. The method is repeated for each additional social change or social change segment ("SC2," "R-SC2," "S-SC2," "M-SC2,". This process can ensure that the social change is reproduced smoothly in each receiving Web browser. Although the Web browsers are identified as initiating and receiving browsers, each Web browser can equally initiate and receive social changes.

Figure 4:
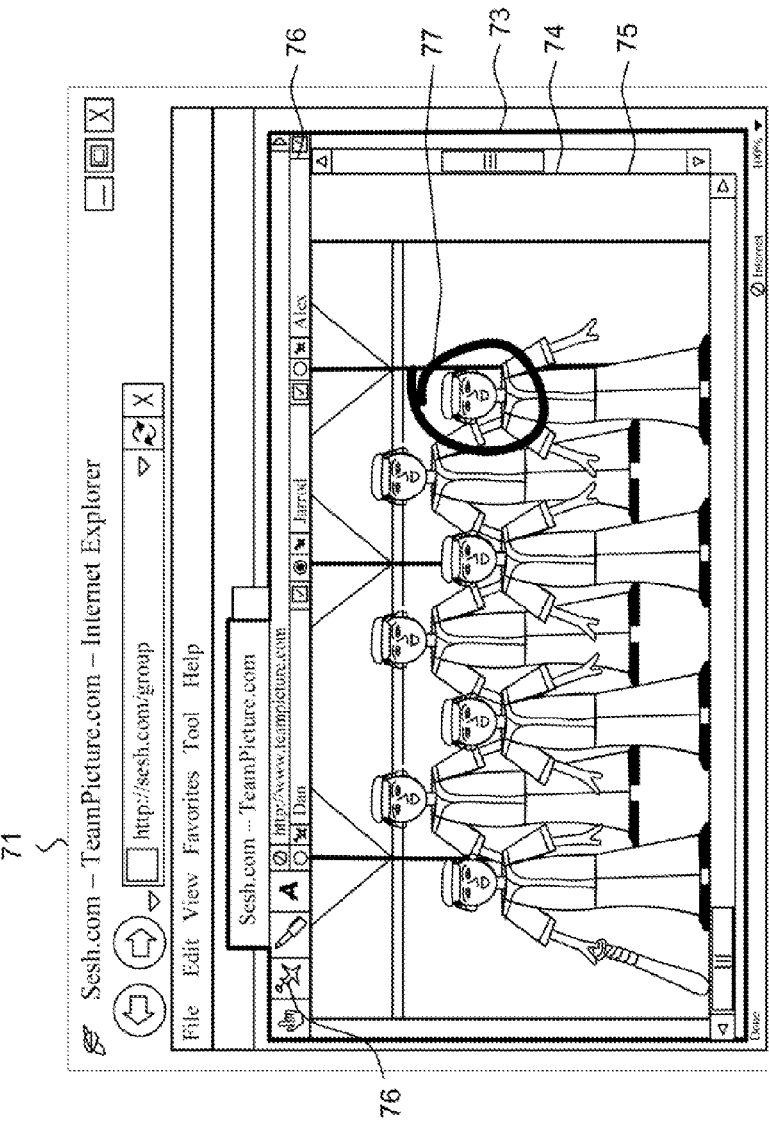
FIG. 4 is a screen shot of a Web browser with a social change displayed on an image.

The social changes allow users to visually communicate through their respective Web browsers regarding the same content Web page. For example, FIG. 4 is a screen shot 70 of a Web browser 71 with a social change 77 displayed. Returning to our previous example, three users are searching for a 1998 Seattle Mariners team photograph with Ken Griffey Jr. Each user is sitting in front of a computer with a Web browser 71. The Web browsers 71 have each loaded a social session Web page 73 with a social viewport 74 that contains a content Web page 75 with the 1998 Seattle Mariners photograph. Although the photograph is displayed, the first user cannot find Ken Griffey Jr. The third user, whose Web browser has been assigned the color blue, recognizes Ken Griffey Jr.'s face in the team photo. The third user tries to explain over the telephone where Ken Griffey Jr. is located in the photo. However, the first user is still unable to find Ken Griffey Jr. among the other players.

To further assist the first user, the third user selects a free drawing fade tool 76 and draws a circle 77 in a counter-clockwise motion around, the face of Ken Griffey Jr. The first and second users view a blue circle smoothly appear in a counter-clockwise motion around the face of Ken Griffey Jr. at the same time that they hear the third user speak the words "here he is" through the telephone, allowing them to easily locate Ken Griffey Social Change Display Individuals can make social changes, such as free drawings or text annotations, on top of a content Web page they are viewing in their respective social \imports to communicate with other users. In one embodiment, social changes are displayed on a transparent overlay that spans the social viewport of each Web browser. FIG. 5 is a screen shot 90 of a Web browser 91 with a corresponding transparent overlay 92 located over a social viewport 93 of a social session Web page 94.

The transparent overlay 92 may consist of a single clear HTML division (DIV) that is stretched over the entire social viewport 93, which displays a content Web page 97. When a user makes a social change, such as using, a freehand drawing fade tool to draw a circle 95 over particular Web content, adjacent semi-transparent DIVs are sequentially inserted onto the transparent overlay 92 to smoothly display the circle 95 while being drawn. The social change 95 is transmitted via social relay servlets to the social session Web pages 94 loaded in the other Web browsers 91, which reproduce the social change 95 by inserting similar DIVs onto their respective transparent overlays 92. The transparent overlay 92 can be intermittently turned off by a selector tool 96, so the user can view and click on the unobstructed content Web page 97. The transparent overlay 92 is automatically reactivated when a user begins making a social change such as a freehand drawing stroke.

In one embodiment, the social changes 95 are implemented using JavaScript to dynamically create adjacent rectangular semi-transparent DIVs without requiring, the installation of applications. Web browser plug-ins such as Java applets or Adobe Flash, ActiveX controls, security permissions, or signed scripts.

Users can create permanent social changes and temporary social changes, which can disappear over time. Permanent social changes, which are comprised of numerous adjacent rectangular DIVs upon creation, are replaced a few seconds after a drawing stroke is completed by a single image comprising the same drawing area, in order to conserve Web browser resources. In a further embodiment, the social changes 95 may be implemented using other graphic elements such as Scalable Vector Graphics (SVG) tags or small rectangular adjacent images.

The transparent overlay prevents social changes from having to be inserted in the HTML of the content Web page, thereby avoiding the alteration of HTML content, distortion of the layout of the Web page, and unwanted interaction with the Web content while constructing the social change. Without a transparent overlay, existing hyperlinks may prevent or make difficult the ready insertion of social changes such as free drawing in the area of the hyperlinks.

Other implementations to display social changes which do not utilize a transparent overlay are possible. DIVs may be inserted directly into the HTML of the content Web page 97. Other graphic elements, such as adjacent small rectangular images, may be inserted directly into the HTML instead of or in addition to DIVs.

A social change may be fixedly associated with Web content, independent of its location in a social viewport. For example, the free drawing social change (a circle) 95 in FIG. 4 may be affixed to the Web content (Ken Gritty Jr.'s head) such that when the content Web page is scrolled, the circle remains in the same position relative to Ken Griffey Jr.'s head. Alternatively, a social change may be fixedly associated with a social viewport, independent of the Web content displayed within it. The social change may be displayed at a fixed distance from the bounds of the social viewport or a transparent overlay. For example, a text chat box may appear automatically in the top right of the social viewport when a chat is started, a fixed distance from a horizontal and a vertical bounds of the social viewport. When the Web content is scrolled, the chat box may remain in the same position in the viewport, floating on top of the Web content which scrolls past it. Similarly, navigation to a new content Web page and the display of entirely new Web content in the social viewport does not affect the placement of the chat box.

Once a social change is fixedly associated to Web content or a social viewport, the embodiments herein allow a user of a Web browser to perform at least one of moving, modifying and deleting the social change within the social viewport. For example, a user may insert a text annotation at a certain location relative to the Web content, and then he or another user may later drag the annotation to another location on the content Web page. A user may later modify the text annotation by typing additional text into the annotation box, both changing the content and increasing the size of the box. Additionally, a social change may be automatically moved within a social viewport in response to another social change proximate to the social change, or mouse cursor movement proximate to the social change. For example, a floating text chat box, which automatically appears in the top right of a social viewport, may automatically move horizontally or vertically out of the way when a user makes a mouse cursor movement or social change next to it. In this way, the user may perform his mouse cursor movement or social change unimpeded, and the text chat box remains on the social viewport, but in a new location.

Social Change Segmentation

Each social change may be partitioned into at least one social change segment of information for sending to other Web browsers participating in a social session. Segmentation enables users of the recipient Web browsers to view social changes as they are progressively created by the user, rather than upon completion; e.g., a freehand drawing is viewable from the beginning of the stroke to the end as the drawing is being drawn, rather than being only viewable upon the completion of the stroke. The recipient users view the social changes recreated at an imperceptible delay, analogous to voice transmittal delay which occurs via commonly used telecommunication mechanisms.

Figure 6:
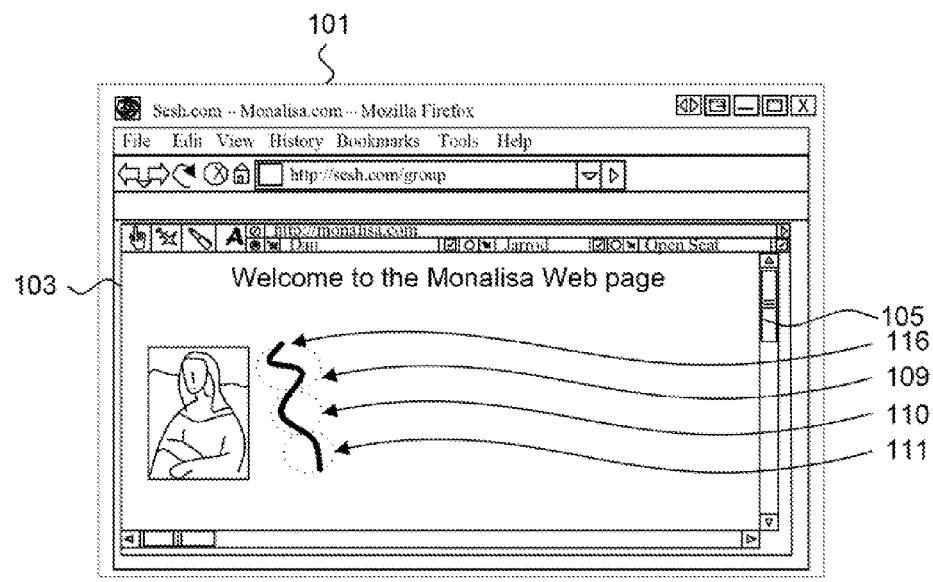
FIG. 6 is a screen shot showing a tint social viewport with segments of a social change, which are mirrored in a second social viewport.

FIG. 6 is a screen shot 100 showing a first social viewport 103 with segments of a social change, which are mirrored in a second social viewport 104. The first social viewport 103 is displayed in a first Web browser 101, such as Mozilla Firefox or Internet Explorer. The second social viewport 104 is also displayed in a Web browser 102, which can be the same or different from the first Web browser 101. The social viewports 103, 104 of both Web browsers 101, 102 display Web content from a same content Web page 105, 106.

A user of the first Web browser 101 can make a social change 116, which is displayed in his social viewport 103. The social change 116 is partitioned into one or more segments 109-111 as the user is making the change 116. The first. Web browser 101 runs code, such JavaScript, to determine a partitioning point for the segments 109-111 of the social change stroke 116. The segment partitioning points are calculated based at least one of size, detail, time elapsed in creating the social change, time elapsed in creating one or more social change segments, a number of previous social change segments, network bandwidth, and amount of data for social changes being, received from the other Web browsers. The partitioning points may be calculated based on other size, bandwidth and display-related factors. The social change segments 109-111 are transmitted sequentially to social relay servlets running, on the social session Web server. A social change may also be transmitted in a single unit, without being partitioned into segments.

The social relay servlets receive the social change segment information and further transmit the information to the second Web browser. The social session Web page loaded in the second Web browser 102 progressively receives the information regarding social change segments 109-111 and reproduces each segment as received 113-115 to recreate the social change 117. Although the first user is identified as initiating social changes, each user can equally initiate and receive social changes. Other combinations of users, Web browsers, segmentation methods, and partitioning points are possible.

Segmentation can be applied to different types of social changes, such as freehand drawing, drafting, text annotation, text chatting, insertion of an image, insertion of audio, and other renderings. For example, a text annotation tool creates a text box for users to type notes, thoughts, and comments for display. Social change segmentation is utilized to transmit the words within the text box as they are typed, in mid-sentence. Unlike typical Instant Messaging methods, which transmit text only after a user selects a transmission button, the text annotation tool transmits words automatically in segments so they appear on each user's social viewport even as the first user continues to type.

In one embodiment, all social session communication and social change segmentation is performed through functionality native to the Web browsers exclusively. The social session is transacted entirely through the standard default ports for HTTP and HTTPS communication Web protocols, and all communication is initiated by the Web browsers. The Web browsers 101, 102 are enabled with JavaScript, and AJAX can be used to transmit and receive social change data to and from social relay servlets via pushlets. All Web browser communication occurs through standard secure firewalls and without installation of applications, Web browser plug-ins including Java applets and Adobe Flash, ActiveX controls, security permissions, or signed scripts. Other implementations for segmentation are possible, including the installation of applications and plug-ins, such as Java applets, Adobe Flash, or ActiveX controls.

Social Change Correlation

Different Web browsers may provide different views of a particular content Web page displayed in their respective social viewports. Items or images may be displayed in different locations based on differences in the rendering, of the content Web page. Social changes made in a social viewport can be aligned to correspond with content which may be laid out differently in different Web browsers.

FIG. 7 is a screen shot 120 of two Web browsers 121, 122 with different layouts of a content Web page. The layout of the content Web page 123 displayed in a social viewport 135 of the first Web browser 121 differs from the layout of the same content Web page 124 displayed in the social viewport 136 of the second Web browser 122 due to variations such as Web browser manufacturer and design, a selected font, and/or other factors.

The social viewport 135 in the first Web browser 121 displays the content Web page 123 with an image 125 located near the left edge of the page 123 under a title, which spans the width of the page 123. The social viewport 136 in the second Web browser 122 displays the content Web page 124 with the same image 126 located in the middle of the page under the title, which is displayed in a larger font on two lines. The upper left corner 129, 130 of the social viewports 135, 136 represents an origin 129, 130. A transparent overlay (not shown) spans the entirety of each social viewport 135, 136, such that the upper left corner 129, 130 of the viewport 135, 136 also represents the origin of the transparent overlay. Similarly, the images 125, 126 located in the social viewports 135, 136 of the first and second Web browsers 121, 122 can be represented by an origin 133, 134 in the upper left corner of each image 125, 126.

A social change on an image in a viewport can be correlated to one or more of at least one nearby HTML tag element and bounds of the social viewport. For example, a first user can make a social change 131 by free drawing a curvy line 131 through the center of an image 125 displayed in a social viewport 135 of a first. Web browser 121. A first point 127 of the drawing stroke 131 can represent an origin for the social change 131. Once the first point 127 has been drawn, the first Web browser 121 can create multiple segments by determining partitioning points of the social change 131.

The embodiments herein determine correlation data for a social change by correlating the origin of the social change with one or more of at least one nearby HTML tag element and bounds of the social viewport. The social change segments and correlation data are transmitted to the other Web browsers. The social session code running in the other Web browsers aligns the social change 131 with the content in the content Web page based on the correlation and segment data.

In one embodiment, the first point 127 of the social change 131 can be aligned to (a) an origin 133 of at least one nearby image HTML tag 125; (b) if no image is nearby, the origin of at least one nearby non-image HTML tag; or (c) if no image or non-image HTML tag is nearby, bounds of the social viewport 135 such as its point of origin 129.

In the example, the image 125 is nearby to the origin 127 of the drawing stroke 131. Thus, the origin of the drawing stroke is aligned to the origin of the image 125. All further segments are aligned to the origin of the social change.

The social session Web page loaded in the second Web browser 122 receives the segment information and correlation data for rendering a mirror image of the social change 132 in the social viewport. An origin 128 of the recreated social change 132 is placed in the same relative location on the same image 126 using the origin 134 of the image 126 and the correlation data received. In one embodiment, the origin 127 of the free drawing stroke 131 is the only point considered in the social change correlation calculation because the information for the stroke 131 is transmitted to and duplicated 132 on the other Web browser 122 in segments while the free drawing stroke 131 is in the process of being drawn. However, other implementations may use different or multiple points of origin and methods of correlation.

Temporary Social Changes

During social communication, thoughts are generated, expressed, and contemplated in the minds of the participants. Social changes allow users participating in a social session to convey their thoughts and impressions, which are displayed on the social viewports within each user's Web browser. In the course of a social visual conversation, multiple social changes, expressing multiple thoughts, may accumulate on the users' social viewports, which can hinder the conversation and obscure the users' view of the content Web page. To avert, these potential problems, users can create temporary social changes which are reversed by disappearing over time.

FIG. 8 is a screen shot 140 of a Web browser 141 with a temporary social change 145 that fades over time. The Web browser 141 displays a content Web page 142, which is displayed simultaneously on the Web browsers 141 of all the users involved in a social session. A user makes a temporary social change 145 on a transparent overlay (not shown) by free drawing a solid "X" 145 over an image 143 displayed in the content Web page 142. Over time, the "X" 145 appears to fade from the display by losing color intensity, which is shown by redrawing the "X" 146 in a lighter semi-transparent color on the transparent overlay of the Web browser 141. The "X" 146 may be redrawn yet again in a lighter or brighter color, and can eventually disappear from the user's view of the content Web page.

Other methods of fading and temporary social changes are possible. For example, a text annotation tool allows a user to create a text annotation by clicking on a location in the content Web page and typing text in the resulting text box. After a period of inactivity, defined by a lack of typing or a change in focus, the text box shrinks and becomes more transparent to avoid distracting users. However, the shrinking and fading can be reversed by running a mouse over or clicking the text box.

The length of time a temporary social change 145, 146 is displayed by the Web browser 141 can be hard coded with a particular default setting or can be adjustable by a computer or user. The timing preferences can be applied to a particular temporal social change or to all temporary social changes. A user can prolong a time period by holding down a mouse button after making a social change. The set time period will start once the user releases the mouse button. In one embodiment, the temporary social change is set by default to fade or flash for a five second time period before the social change 145, 146 is removed from the transparent overlay. In a further embodiment, the user creating the temporary social change may set the time period the social change will be displayed in each Web browser participating in the social session. The temporary social change 145, 146 can remain in original form or can blink, flash, or sound an alarm during the time period displayed. Other forms, methods, and time periods are possible for displaying temporary social changes.

Viewport Commensuration

Each participant involved in a face-to-face conversation is usually privy to the same information and content as the other participants in the group. In contrast, when users of different Web browsers visit a particular content Web page, they may not have the same view of the Web content. The content can be laid out differently in different Web browsers due to a variety of factors, including viewport size, Web browser manufacturer, version, and selected font. To create a shared knowledge space, in which users have the same view of the Web content, viewport commensuration is performed.

Events which may trigger a viewport commensuration action include a new Web browser joining a social session, loading a content Web page within the social viewport of one of the Web browsers, changing the size of one of the Web browsers, and scrolling the content Web page within the social viewport of one of the Web browsers.

FIG. 9 is a screen shot 150 showing commensurate viewports 159, 160 on separate Web browsers 151, 152. A first and second Web browser 151, 152 independently load a social session Web page 161, 162. Each social session Web page 161, 162 contains a social viewport 159, 160. A content Web page 163, 164 is displayed in each of the social viewports 159, 160.

Upon the loading of a content Web page within the social viewport of at least one Web browser, the embodiments herein report the social viewport dimensions data of each Web browser 151, 152 to social relay servlets running on a social session Web server. The social relay servlets determine the dimensions of a common social viewport that is largest and makes viewable substantially similar portions of the content Web page in each of the Web browsers.

The social relay servlets calculate the largest common social viewport by choosing, a height dimension from the Web browser with the smallest ratio of social viewport height to the content Web page height, and choosing a width dimension from the Web browser with the smallest ratio of social viewport width to the content Web page width. Here, the first Web browser 151 has both the smallest height and smallest width ratios; thus, the largest common social viewport has dimensions identical to those of the first Web browser 151. The social session Web page 161, 162 loaded in each Web browser 151, 152 receives the viewport dimensions. The dimensions of the first Web browser 151 remain unchanged; however, the viewport dimensions of the second Web browser 152 are adjusted to the common viewport dimensions. The area between the bounds of the social session Web page 162 and the adjusted (and now smaller) social viewport of the second Web browser 152 are represented by blank spaces 155,156.

The embodiments herein also determine correlation data for the Web browsers by correlating bounds of the Web browser's social viewport with at least one nearby HTML tag element. Image HTML tags are preferred because the subject of social visual communication on Web pages is often the images displayed in the content Web pages. The correlation data is transmitted to each other Web browser. Code running in the social session Web pages 161,162 of the Web browsers 151,152 adjusts the width dimension based on the correlation data from the Web browser 151 whose width dimension is chosen as a width for the common social viewport dimensions, and adjusts the height dimension based on the correlation data from the Web browser 151 whose height dimension is chosen as a height for the common social viewport dimensions.

In one embodiment, each Web browser is assigned at least one identifier, such as text, color, images, and sounds. An identifier of the Web browser with the limiting social viewport dimensions is displayed in the blank space 155, 156 between the social viewport 160 and the bounds of the Web browser 152 to identify the Web browser responsible for the social viewport size restriction. Other methods, programs, calculations, and factors are possible to implement commensurate viewports.

Viewport Scrolling Synchronization

Figure 10:
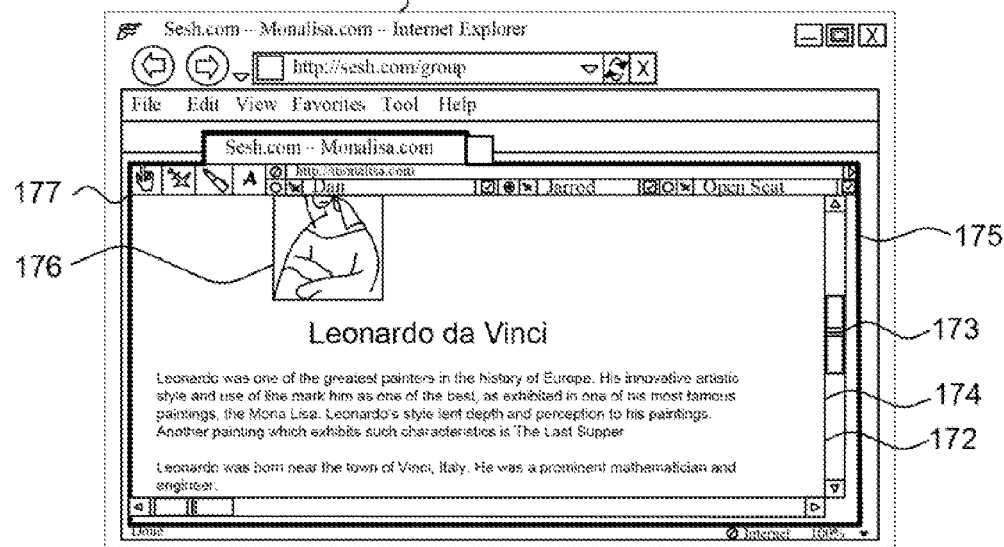
FIG. 10 is a screen shot of a Web browser showing scrolling, synchronization.

Viewport scrolling synchronization can ensure that substantially similar portions of a content Web page are viewable in the social viewport of each Web browser. As one user scrolls the content Web page, the embodiments herein adjust the social viewports of the other Web browsers to common scroll locations. FIG. 10 is a screen shot 170 of a Web browser 171 showing scrolling synchronization. The Web browser 171 contains a social session Web page 175 for displaying a content Web page 174 within a social viewport 172. A user can drag a right scroll bar 173 of the social viewport 172 to make the lower half of a content Web page viewable within the social viewport 172.

The embodiments herein determine correlation data for the social viewport 172 which initiated the scrolling of the content Web page, by correlating bounds of the Web browser's social viewport 172 with at least one nearby HTML tag element. Here, a distance is measured between the origin 177 (top left bounds) of the social viewport and the origin of the closest image HTML tag element 176 the origin of the image is offscreen). The correlation data is sent to social relay servlets for transmission to the other Web browsers in the social session. Upon receipt, each other Web browser locates the equivalent image HTML tag and origin of the social viewport, and adjusts its social viewport scroll location relative to them based on the correlation data. Other methods, tools, and movements for mirroring user scrolling of a content Web page on another social viewport are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for automated synchronized co-browsing, comprising:
    a plurality of Web browsers to establish a co-browse session, each Web browser loaded with social session code, which displays a social viewport;
    a memory; and
    a processor operatively coupled to the memory and configured to execute the social session code, comprising:
        code to obtain Web content in response to a request from one of the Web browsers and to provide the Web content to each Web browser;
        code to make viewable substantially similar portions of the Web content in each social viewport by selectively resizing the social viewports of the Web browsers by comparing social viewport dimensions from each Web browser to determine dimensions of a common social viewport that is largest and makes viewable substantially similar portions of the Web content in each of the Web; browsers and and by directing the social session code in each Web browser to adjust a size of that Web browser's social viewport to the dimensions of the largest common social viewport.

2. A system according to claim 1, wherein the social session code, further comprises:
    code to determine the largest common social viewport dimensions by choosing a height dimension from the Web browser with the smallest ratio of social viewport height to the Web content height, and by choosing a width dimension from the Web browser with the smallest ratio of social viewport width to the Web content width.

3. A system according to claim 2, wherein the social session code further comprises:
    code to determine correlation data for at least one Web browser by correlating bounds of the Web browser's social viewport with at least one nearby HTML tag element; and
    code to direct the social session code in each Web browser to adjust the width dimension based on the correlation data from the Web browser whose width dimension is chosen as a width for the common social viewport dimensions, and to adjust the height dimension based on the correlation data from the Web browser whose height dimension is chosen as a height for the common social viewport dimensions.

4. A system according to claim 1, wherein the wherein the social session code further comprises:
   code to resize the social viewports of the Web browsers in response to at least one of a new Web browser joining the co-browse session, to load Web content in the social viewport of one of the Web browsers, to change the size of one of the Web browsers, and to scroll the Web content within the social viewport of one of the Web browsers.

5. A system according to claim 1, wherein the social session code further comprises:
   code to make viewable substantially similar portions of the Web content in each social viewport by adjusting the social viewports of the Web browsers to common scroll locations.

6. A system according to claim 5, wherein the social session code further comprises:
   code to adjust the social viewports of the Web browsers to common scroll locations in response to scrolling of the Web content within the social viewport in one such Web browser.

7. A system according to claim 6, wherein the social session code further comprises:
   code to determine correlation data for the social viewport which initiated the scrolling of the Web content, by correlating bounds of the Web browser's social viewport with at least one nearby HTML tag element; and
   code to direct the other Web browsers to adjust their social viewport scroll locations based on the correlation data.

8. A system according to claim 2, wherein the social session code further comprises:
   code to generate a notification in the Web browsers in response to an action from one such Web browser selected from a group comprising navigating, scrolling, and social viewport sizing.

9. A system according to claim 8, further comprising one or more of:
   output configured to provide the notification through at least one of text, color, image, and sound;
   a component affected by the action, wherein the component is modified in response to the notification and the component is selected from a group comprising a navigation bar, scroll bar, user bar, social viewport and status bar;
   a mouse cursor affected by the action, wherein the mouse cursor is modified in response to the notification;
   a representation of the component affected by the action, wherein the representation is modified in response to the notification and the component is selected from the group comprising a navigation bar, scroll bar, user bar, social viewport and status bar; and
   a change indicator in proximity to the component affected by the action, wherein the change indicator is modified in response to the notification and the component is selected from the group comprising a navigation bar, scroll bar, user bar, social viewport and status bar.

10. A system according to claim 1, wherein the social session code further comprises:
    code to display in each Web browser progress of each of the Web browsers in loading the Web content.

11. A system according to claim 1, wherein the social session code further comprises:
    code to define permissible actions allowed to be performed by at least one of the Web browsers; and
    code to restrict the at least one Web browser to the permissible actions.

12. A system according to claim 1, wherein the co-browse session is performed through functionality native to the Web browsers exclusively.

13. A system according to claim 1, wherein the co-browse session is transacted entirely through the standard default ports for HTTP and HTTPS communication Web protocols, and all communication is initiated by the Web browsers.

14. A method for automated synchronized co-browsing, comprising:
    establishing a co-browse session comprising a plurality of Web browsers, each Web browser loaded with social session code, which displays a social viewport,
    obtaining Web content in response to a request from one of the Web browsers;
    providing the Web content to each Web browser; and
    making viewable substantially similar portions of the Web content in each social viewport by selectively resizing the social viewports of the Web browsers comprising:
       comparing social viewport dimensions from each Web browser;
       determining the dimensions of a common social viewport that is largest and makes viewable substantially similar portions of the Web content in each of the Web browsers; and
       directing the social session code in each Web browser to adjust a size of that Web browser's social viewport to the dimensions of the largest common social viewport.

15. A method according to claim 14, further comprising:
    determining the largest common social viewport dimensions by choosing a height dimension from the Web browser with the smallest ratio of social viewport height to the Web content height, and choosing a width dimension from the Web browser with the smallest ratio of social viewport width to the Web content width.

16. A method according to claim 15, further comprising:
    determining correlation data for at least one Web browser by correlating bounds of the Web browser's social viewport with at least one nearby HTML tag element; and
    directing the social session code in each Web browser to adjust the width dimension based on the correlation data from the Web browser whose width dimension is chosen as a width for the common social viewport dimensions, and to adjust the height dimension based on the correlation data from the Web browser whose height dimension is chosen as a height for the common social viewport dimensions.

17. A method according to claim 14, further comprising:
    resizing the social viewports of the Web browsers in response to at least one of a new Web browser joining the co-browse session, loading of Web content in the social viewport of one of the Web browsers, changing of the size of one of the Web browsers, and scrolling of the Web content within the social viewport of one of the Web browsers.

18. A method according to claim 14, further comprising:
    making viewable substantially similar portions of the Web content in each social viewport by adjusting the social viewports of the Web browsers to common scroll locations.

19. A method according to claim 18, further comprising:
    adjusting the social viewports of the Web browsers to common scroll locations in response to scrolling of the Web content within the social viewport in one such Web browser.

20. A method according to claim 19, further comprising:
determining correlation data for the social viewport which initiated the scrolling of the Web content, by correlating bounds of the Web browser's social viewport with at least one nearby HTML tag element; and
directing the other Web browsers to adjust their social viewport scroll locations based on the correlation data.

21. A method according to claim 14, further comprising:
generating a notification in the Web browsers in response to an action from one such Web browser selected from a group comprising navigating, scrolling, and social viewport sizing.

22. A method according to claim 21, further comprising one or more of:
providing the notification through at least one of text, color, image, and sound;
modifying a component affected by the action in response to the notification, wherein the component is selected from a group comprising a navigation bar, scroll bar, user bar, social viewport and status bar;
modifying a mouse cursor affected by the action in response to the notification;
modifying a representation of the component affected by the action in response to the notification, wherein the component is selected from the group comprising a navigation bar, scroll bar, user bar, social viewport and status bar; and
modifying a change indicator in proximity to the component affected by the action in response to the notification, wherein the component is selected from the group comprising a navigation bar, scroll bar, user bar, social viewport and status bar.

23. A method according to claim 14, further comprising:
displaying in each Web browser progress of each of the Web browsers in loading the Web content.

24. A method according to claim 14, further comprising:
defining permissible actions allowed to be performed by at least one of the Web browsers; and
restricting the at least one Web browser to the permissible actions.

25. A method according to claim 14, wherein the co-browse session is performed through functionality native to the Web browsers exclusively.

26. A method according to claim 14, wherein the co-browse session is transacted entirely through the standard default ports for HTTP and HTTPS communication Web protocols, and all communication is initiated by the Web browsers.

27. A computer-readable storage medium holding code for performing the method according to claim 14.

* * * * *